United States Patent [19]

Carlin et al.

[11] 4,161,221

[45] Jul. 17, 1979

[54] METHOD AND APPARATUS FOR PRETENSIONING SCREW JOINTS

[75] Inventors: Carl-Gustaf Carlin, Tyresö; Stefan M. B. Skyllermark, Nacka, both of Sweden

[73] Assignee: Atlas Copco Aktiebolag, Nacka, Sweden

[21] Appl. No.: 852,286

[22] Filed: Nov. 17, 1977

[30] Foreign Application Priority Data

Nov. 22, 1976 [SE] Sweden ................................ 7613006

[51] Int. Cl.[2] ................................................ B23Q 19/06

[52] U.S. Cl. ............................................ 173/1; 173/12

[58] Field of Search .................. 29/240; 73/88 F, 139; 81/52.4 R, 52.5; 173/1, 12

[56] References Cited

U.S. PATENT DOCUMENTS

| | | | |
|---|---|---|---|
| 3,939,920 | 2/1976 | Hardiman et al. | 173/1 |
| 3,974,685 | 8/1976 | Walker | 173/12 X |
| 3,974,883 | 8/1976 | Sigmund | 173/12 |
| 3,982,419 | 8/1976 | Boys | 173/12 X |
| 4,014,208 | 3/1977 | Moore et al. | 73/88 F X |
| 4,016,938 | 4/1977 | Rice | 173/12 X |
| 4,026,369 | 5/1977 | Vliet | 73/88 F X |

*Primary Examiner*—Lawrence J. Staab

*Attorney, Agent, or Firm*—Frishauf, Holtz, Goodman and Woodward

[57] ABSTRACT

A method and apparatus for tightening a screw joint to a predetermined axial load $F_p$ providing the spring constant $k=(F/\phi)$ of the joint is known, wherein the torque/rotation relationship M ($\phi$) is determined during the linear, elastic deformation part of the tightening process by calculating the joint stiffness ($dM/d\phi$) at an arbitrarily chosen torque level $M_2$. A theoretical, tensionless angular position $\phi_0$ of the joint is calculated by extrapolating the determined torque/rotation relationship M ($\phi$), and the tightening process is interrupted as an angular interval $\Delta\phi$ from said theoretical, tensionless position $\phi_0$ has been passed, which interval according to the spring constant k of the joint corresponds to the predetermined axial load $F_p$.

10 Claims, 3 Drawing Figures

METHOD AND APPARATUS FOR PRETENSIONING SCREW JOINTS

BACKGROUND OF THE INVENTION

This invention relates to a method and an apparatus for tightening a screw joint to a predetermined axial load.

According to the most common joint pretensioning method the joint is tightened to a certain torque level. This torque level has been determined experimentally to correspond to a desired tension in the joint. Due to variations in friction, this method suffers from very large deviations in obtained axial load.

A previously known method to avoid this drawback is described in U.S. Pat. No. 3,939,920. According to the described method, the screw joint is tightened to its yield point and the applied torque at this point is registered. This method is based on the fact that at the yield point a certain axial load is obtained in relation to a certain torque. This torque is in turn dependent on the actual friction forces in the joint. From this relationship it is possible to determine the obtained axial load at the yield point by measuring the applied torque. Thereby, the axial load/torque relationship is determined for a certain joint. In order to obtain a desired axial load in a joint according to this method the joint is tightened to its yield point in order to establish the actual load/torque relationship, whereupon the joint is slackened and retightened to a torque level which corresponds to the desired axial load magnitude.

This previously known method suffers from two serious sources of error which seriously impair the accuracy of the obtained axial load. One of these is due to the fact that, in the theoretical basis for determining the axial load at the yield point, it has been assumed that the friction forces are of the same magnitude in the thread as beneath the head of the screw or the nut. This is the case in exceptional cases only and, normally, there is obtained deviations in the axial load. The theory is based on the fact that the friction forces in the thread of the joint give rise to a torsion load in the screw which affects the torque obtained at the yield point. The friction forces acting under the head of the screw and/or the nut also result in an augmented torque level but do not influence upon the tension of the screw. Variations in the friction forces beneath the screw head and/or nut therefore cause deviation in the obtained axial load.

The other source of error in this known method relates to the fact that the joint has to be tightened twice. At the second tightening, the friction forces in the joint are considerably less than at the first tightening, which means that the torque magnitude which was estimated to give the desired axial load from the first tightening will be too high. Moreover, the variations in the friction reduction are considerable.

In addition, this known method requires a relatively long cycle time and a complicated control system for the nutrunner.

The object of the present invention is to solve the aforementioned problems.

SUMMARY OF THE INVENTION

In accordance with the present invention, a method for pretensioning a screw joint to a predetermined axial load ($F_p$), the tension/rotation relationship $$\left(\frac{F}{\phi}\right)$$

of the screw joint being known, comprises determining the torque/rotation relationship $M(\phi)$ during the linear, elastic deformation sequence of the tightening process; calculating by extrapolation of said torque/rotation relationship $M(\phi)$ a theoretical, tensionless angular position ($\phi_0$) of the screw joint; applying a tightening torque to the screw joint; sensing when the screw joint has been rotated with relation to said theoretical, tensionless angular position ($\phi_0$) an angular interval ($\Delta\phi$) which according to said known tension/rotation relationship $$\left(\frac{F}{\phi}\right)$$

corresponds to said predetermined axial load ($F_p$); and then discontinuing said tightening torque application responsive to said sensing when the screw joint has been rotated through said angular interval ($\Delta\phi$).

According to a further aspect of the invention, apparatus is provided for carrying out the above method.

DETAILED DESCRIPTION

The screw joint pretensioning method according to the invention is based on the fact that the spring constant of a screw joint varies within very narrow limits only. This is the fact especially at joints in which the components are manufactured and machined with explicit care. Such joints are to be found at crank shaft bearing caps and cylinder heads of internal combustion engines. In such joints there are still some considerable variations in the friction forces, and the main object of the invention is to accomplish an accurate predetermined axial load in the joint without being influenced by the friction forces. To this end the angle of rotation in the joint is used as a reference instead of the installed torque.

Figure 1:
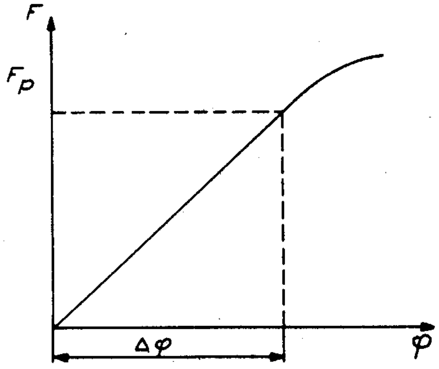
FIG. 1 is a diagram showing the axial load/rotation relationship in a screw joint.

Thus, the tightening process according to the invention is based on the fact that the spring constant k, i.e., the axial load/rotation relationship ($F/\phi$) for the joint is known. This relationship is determined experimentally by measuring the axial load and the angle of rotation at a number of joints of the actual type. The obtained mean value may be illustrated graphically as in FIG. 1 where F designates the axial load, $\phi$ the angle of rotation and $\Delta\phi$ the specific angle of rotation which corresponds to the desired axial load $F_p$.

Figure 2:
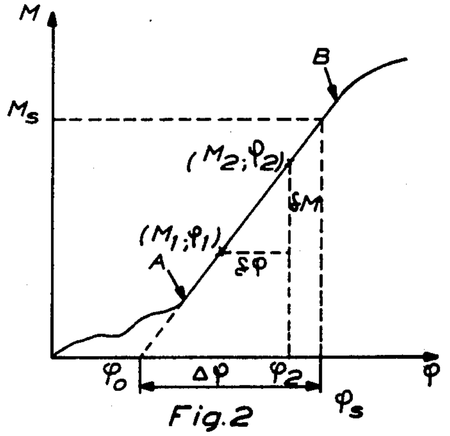
FIG. 2 is a diagram in which the torque/rotation relationship of the screw joint is illustrated and, FIG. 3 shows schematically a nutrunner provided with a control unit according to the invention.

In FIG. 2, there is graphically illustrated a typical such relationship at tightening a joint up to the yield point. The curve illustrates how the tightening process comprises three different sequences, namely a first sequence from zero to point A, a second sequence from point A to point B and a third sequence above point B.

The first sequence, ending at point A on the curve, illustrates the running down process of the screw or nut and comprises a very uneven torque growth. At point A, the tightening process is continued with the second sequence which is linear and which represents an increased elastic pretensioning of the joint. From point B on, the third sequence starts and shows a decreasing torque growth as a result of plastic deformation of the joint. Point B represents the yield point of the joint.

So, the linear part of the curve illustrates the elastic deformation of the joint, which is caused by an increasing axial load. The gradient of the curve corresponds to the stiffness of the joint.

According to the present invention, the torque/rotation relationship M ($\phi$) is determined within the linear, elastic deformation range, between points A and B on the curve. This is accomplished by calculating the torque/rotation gradient (dM/d$\phi$) at an arbitrarily chosen point $M_2$, $\phi_2$. This is apparent from FIG. 2, wherein the point $M_2\phi_2$ is chosen anywhere within the linear elastic deformation range.

By extrapolating the linear part of the torque/rotation relationship M ($\phi$), there is determined an angular position $\phi_0$ which represents a theoretical tensionless joint condition. To obtain the desired pretension $F_p$, the joint has to be rotated an angle $\Delta\phi$ from the above calculated tensionless position $\phi_0$. Accordingly, the total tightening angle $\phi_s=\phi_0+\Delta\phi$.

Figure 3:
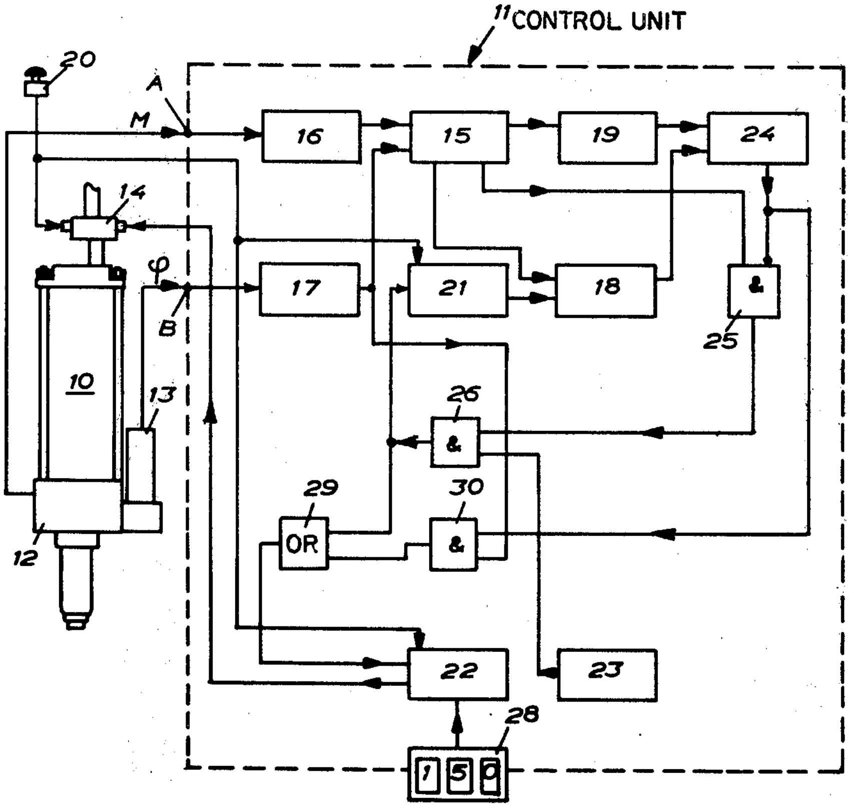

In FIG. 3 there is shown schematically a device for carring out the pretensioning method according to the invention. The apparatus comprises a pneumatically powered nut runner 10 and a control unit 11 connected thereto. The nut runner 10 is provided with torque and rotation sensing and signal delivering means 12, 13, respectively. The control unit 11 is connected to the nut runner 10 via signal inputs A and B. The control unit 11 is also connected to a pressure air inlet valve 14 of the nut runner 10.

Further details of the apparatus are not listed but will appear from the following description of the operation.

When pretensioning a screw joint according to the invention, torque and rotation signals are fed into a differentiating device 15 via an amplifier 16 and a signal conditioning unit 17. In the differentiating device 15 the torque/rotation gradient (dM/d$\phi$) is calculated and passed on to a multiplier device 18. As a torque level $M_2$ is obtained, the differentiating device 15 is arranged to pass that signal to a holding circuit 19. The torque level $M_2$ is arbitrarily chosen.

The nut runner 10 is provided with a trigger switch 20 which is arranged to start the operation by activating the inlet valve 14, resetting to zero a pulse counter 21 and presetting another pulse counter 22 to a desired number of angle related pulses. This number of pulses is supplied from a manually adjustable element 28 and represents the required tightening angle $\Delta\phi$.

The counter 21 is arranged to count pulses from an oscillator 23 and to forward a sum value to the multiplier device 18. The number of pulses received and counted by counter 21 represents the rotation interval which is multiplied in the multiplier device 18 with the torque/rotation gradient (dM/d$\phi$) in order to obtain the quantity n, (dM/d$\phi$). This rapidly growing quantity is compared to the obtained torque value $M_2$ by a comparator 24 and, when these values are equal, the comparator 24 will produce an output signal. The obtained number of pulses corresponds to the rotation angle $\phi_2-\phi_0$.

The differentiating device 15 is arranged to deliver an output signal to AND-gate 25 as the actual torque in the joint has reached the value $M_2$. The AND-gate 25 which is provided with an inverted input from comparator 24 and lets through a signal to the AND-gate 26 when the torque in the joint reaches the torque level $M_2$. The AND-gate 26 is connected to the oscillator 23 and when receiving a signal from AND-gate 25 it will let through the pulses from oscillator 23 to the counter 21.

When a sufficiently large number of pulses have been let through and have been multiplied with the torque/-rotation gradient (dM/d$\phi$), a balance position is obtained in the comparator 24 and an output signal is delivered therefrom. This output signal is fed to the inverted input of AND-gate 25 and inhibits AND-gate 25 so as to interrupt further pulse transmission through AND-gate 26.

Those pulses which have passed through the AND-gate 26 and which have been counted by the counter 21 correspond to the rotation interval $\phi_2-\phi_0$.

The pretensioning of the joint is completed by turning the joint an angle $\Delta\phi$-($\phi_2-\phi_0$). This is accomplished by the control unit 11 in the following way.

The desired predetermined axial load $F_p$ in the joint has been translated into an angle of rotation $\Delta\phi$ by means of the spring constant k of the joint. The number of pulses corresponding to the size of this angle has been fed into the counter 22, via a manually adjustable element 28. The counter 22 which is connected to counter 21 and oscillator 23 via an OR-gate 29, has received the same number of pulses as the counter 21, which number of pulses corresponds to the rotation interval $\phi_2-\phi_0$. The counter 22 is arranged to subtract this number of pulses from the number of pulses supplied by the member 28. The remaining number of pulses corresponds to $\Delta\phi$-($\phi_2-\phi_0$)

As the torque magnitude $M_2$ is reached, the AND-gate 26 is closed or inhibited while another AND-gate 30 is enabled or opened. OR-gate 30 is arranged to interconnect the counter 22 and the rotation sensing means 13 of the nut runner 10 when the torque magnitude $M_2$ is reached. During continued tightening, the counter 22 subtracts these angle pulses from the remaining number of pulses which correspond to $\Delta\phi$-($\phi_2-\phi_0$). When the counter 22 reaches zero, the joint consequently has reached the angular position $\phi_s$, whereby the counter 22 delivers an output signal to the inlet valve 14 of the nut runner 10 so as to initiate discontinuing of the tightening process.

A complete pretensioning cycle has now been described. Another pretensioning may be commenced immediately after this just by pressing the trigger 20. The counter 21 is reset and the counter 22 is preset to a value corresponding to $\Delta\phi$ (that is, the value corresponding to the setting of manually adjustable element 28).

The embodiments of the invention are not limited to the shown and described example, but can be freely varied within the scope of the invention as it is defined in the claims. It is possible to calculate the joint stiffness (dM/d$\phi$) in different ways as well as choosing a suitable torque level $M_2$ for calculation of the theoretical, tensionless angular position $\phi_0$.

We claim:

1. Method for pretensioning a screw joint to a predetermined axial load ($F_p$), the tension/rotation relationship $$\left(\frac{F}{\phi}\right)$$

of the screw joint being known, comprising the steps of:

determining the torque/rotation relationship $M(\phi)$ during the linear, elastic deformation sequence of the tightening process, calculating by extrapolation of said torque/rotation relationship $M(\phi)$ a theoretical, tensionless angular position ($\phi_0$) of the screw joint, applying a tightening torque to the screw joint, sensing when the screw joint has been rotated with relation to said theoretical, tensionless angular position ($\phi_0$) an angular interval ($\Delta\phi$) which according to said known tension/rotation relationship $$\left(\frac{F}{\phi}\right)$$

corresponds to said predetermined axial load ($F_p$), and then discontinuing said tightening torque application responsive to said sensing when the screw joint has been rotated through said angular interval ($\Delta\phi$).

2. Method according to claim 1, wherein said torque/rotation relationship $M(\phi)$ is calculated from an arbitrarily chosen torque level ($M_2$) and from the torque/rotation gradient $$\left(\frac{dM}{d\phi}\right)$$

determined at said torque level ($M_2$), said arbitrarily chosen torque level ($M_2$) corresponding to an angular position ($\phi_2$) which is well within the angular interval ($\Delta\phi$) and above said theoretical, tensionless angular position ($\phi_0$).

3. Method according to claim 2, comprising determining the angular interval between said angular position ($\phi_2$) corresponding to said arbitrarily chosen torque level ($M_2$) and said theoretical, tensionless angular position ($\phi_0$) by generating angle pulses each of which correspond to a given angle of turning of said screw joint; generating a torque/gradient signal $$\left(\frac{dM}{d\phi}\right);$$

and counting that number of said angle pulses which together with the torque/gradient $$\left(\frac{dM}{d\phi}\right)$$

forms a product that equals the value of said torque level ($M_2$).

4. Method according to claim 3, wherein before the tightening of said screw joint is commenced the angular interval ($\Delta\phi$) which corresponds to said predetermined axial load ($F_p$) is stored in the form of a number of signal pulses; the number of pulses representing the angular interval between said theoretical, tensionless angular position ($\phi_0$) and said angular position ($\phi_2$) corresponding to said chosen torque level ($M_2$) are during tightening subtracted from said stored number of pulses; and the tightening torque application is continued over a further angular interval $\Delta\phi$-($\phi_2-\phi_0$) represented by the rest of the stored pulses remaining after said subtraction.

5. Method according to claim 4, comprising generating that number of pulses which represents the angular interval between said theoretical, tensionless angular position ($\phi_0$) and said angular position ($\phi_2$) corresponding to said chosen torque level ($M_2$) by an oscillator (23), and subtracting the rest of said stored pulses by pulses produced by a rotation sensing means (13) connected to a joint tightening means.

6. Apparatus for pretensioning a screw joint to a predetermined axial load ($F_p$) where the axial load/rotation relationship $$\left(\frac{F}{\phi}\right)$$

of the joint is known, comprising:

means (10) for delivering torque to the screw joint, torque sensing and signal delivering means (12) coupled to said torque delivering means, rotation sensing and signal delivering means (13) coupled to said torque delivering means, a control unit (11) connected to said torque sensing and rotation sensing means (12, 13) to receive signals therefrom in response to the instantaneous torque and rotation values of the screw joint, said control unit (11) including:

first calculating means (15, 19) for determining the actual torque/rotation relationship $M(\phi)$, second calculating means (18, 21, 23, 24) for determining a theoretical tensionless angular position ($\phi_0$) of the joint, and means (22, 28) for initiating shut off of said torque delivering means (10) when the joint has been rotated from said theoretical tensionless angular position ($\phi_0$) an angular interval ($\Delta\phi$) which, according to said known axial load/rotation relationship $$\left(\frac{F}{\phi}\right),$$

corresponds to said predetermined axial load ($F_p$).

7. Apparatus according to claim 6, wherein said second calculating means comprises a pulse producing oscillator (23), a first pulse counter (21) coupled to said oscillator, means for producing a signal corresponding to the gradient $$\left(\frac{dM}{d\phi}\right)$$

of said torque/rotation relationship M(d), a multiplier device (18) continuously forming the product of the number of counted pulses from said first pulse counter and the gradient $$\left(\frac{dM}{d\phi}\right)$$

of said torque/rotation relationship $M(\phi)$, and a comparator (24) coupled to said multiplier device for comparing said product and a signal corresponding to a certain torque level ($M_2$) corresponding to an angular position ($\phi_2$) located within said angular interval ($\Delta\phi$) as the latter is counted from said theoretical, tensionless angular position ($\phi_0$).

8. Apparatus according to claim 7, wherein said first calculating means comprises differentiating means (15) which includes means for developing said gradient of said torque/rotation relationship $M(\phi)$, and a holding circuit means coupled to said differentiating means for generating said signal corresponding to said certain torque level ($M_2$) corrsponding to said angular position ($\phi_2$).

9. Apparatus according to claim 7, wherein said means (22, 28) for initiating shut off of said torque delivering means (10) comprises a second counter (22) for storing the number of pulses which corresponds to the angular interval ($\Delta\phi$) which in turn corresponds to said predetermined axial load ($F_p$).

10. Apparatus according to claim 9, wherein said means for initiating shut off of said torque delivering means further comprises means for subtracting the number of pulses representing the angular interval between said theoretical tensionless angular position ($\phi_0$) and said angular position ($\phi_2$) corresponding to said chosen torque level ($M_2$) from the number of pulses stored in said second counter during the application of the tightening torque to the screw joint.

* * * * *

UNITED STATES PATENT AND TRADEMARK OFFICE
CERTIFICATE OF CORRECTION

PATENT NO. : 4,161,221

DATED : July 17, 1979

INVENTOR(S) : Carl-Gustaf CARLIN et al

It is certified that error appears in the above-identified patent and that said Letters Patent are hereby corrected as shown below:

Column 3, line 56, change "pulses" to --pulses n--;

Column 4, line 36, change "OR-gate" to --AND-gate--.

Signed and Sealed this

*Fourth* Day of *December 1979*

[SEAL]

*Attest:*

SIDNEY A. DIAMOND

*Attesting Officer* *Commissioner of Patents and Trademarks*

Notice of Adverse Decision in Interference

In Interference No. 100,527, involving Patent No. 4,161,221, C. G. Carlin and S. M. B. Skyllermark, METHOD AND APPARATUS FOR PRETENSIONING SCREW JOINTS, final judgment adverse to the patentees was rendered May 11, 1982, as to claims 1, 2 and 6.

[*Official Gazette August 17, 1982.*]